(12) United States Patent
Frait et al.

(10) Patent No.: US 6,945,309 B2
(45) Date of Patent: Sep. 20, 2005

(54) METHOD AND APPARATUS FOR FORMING A PART WITH DAMPENER

(75) Inventors: John Frait, Ann Arbor, MI (US); Michael Dunn, Canton, MI (US); Marcello Tedesco, Saline, MI (US); Daniel Sandberg, Plymouth, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 10/622,921

(22) Filed: Jul. 18, 2003

(65) Prior Publication Data

US 2005/0011628 A1 Jan. 20, 2005

(51) Int. Cl.[7] .................. B22C 9/10; B22D 29/00; B22D 33/04
(52) U.S. Cl. .............. 164/132; 164/137; 164/369
(58) Field of Search .................. 164/132, 137, 164/340, 342, 369, 397, 398, 399

(56) References Cited

U.S. PATENT DOCUMENTS

| | | | |
|---|---|---|---|
| 2,263,079 A | 11/1941 | Flynn | |
| 2,370,361 A | 2/1945 | Jeune | |
| 2,687,627 A | 8/1954 | Binder | |
| 3,292,746 A | 12/1966 | Robinette | |
| 3,368,654 A | 2/1968 | Wegh | |
| 3,425,523 A | 2/1969 | Robinette | |
| 3,611,830 A | 10/1971 | Shank | |
| 3,732,953 A | 5/1973 | Huet | |
| 3,774,472 A | 11/1973 | Mitchell | |
| 3,774,473 A | 11/1973 | Mitchell | |
| 3,861,501 A | 1/1975 | Brooks | |
| 3,983,973 A | 10/1976 | Zboralski | |
| 4,556,130 A | 12/1985 | Puszakowski | |
| 4,653,169 A | 3/1987 | Puszakowski | |
| 4,656,899 A | 4/1987 | Contoyonis | |
| 5,004,078 A | * 4/1991 | Oono et al. ............. 188/218 A |
| 5,184,663 A | 2/1993 | Oono et al. | |
| 5,383,539 A | 1/1995 | Bair | |
| 5,479,981 A | * 1/1996 | Kim ............................ 164/16 |
| 5,855,257 A | 1/1999 | Wickert | |
| 6,223,866 B1 | 5/2001 | Giacomazza | |
| 6,336,533 B1 | * 1/2002 | Pollock et al. .......... 188/250 B |
| 6,568,512 B1 | 5/2003 | Tolani | |

FOREIGN PATENT DOCUMENTS

| | | | | |
|---|---|---|---|---|
| DE | 24 46 938 A1 | * | 4/1976 | ........... F16D/65/12 |
| GB | 1219821 | | 1/1971 | |
| JP | 10009301 | | 1/1998 | |

* cited by examiner

Primary Examiner—Kevin P. Kerns
(74) Attorney, Agent, or Firm—Marshall & Melhorn LLC

(57) ABSTRACT

A method for producing a damped part where a sand core is formed with at least one dampening structure with the sand core. The sand core with the at least one dampening structure therein is located in a mold. A part is cast from the mold and the sand core. The sand core is removed from the cast part leaving the at least one dampening structure in contact with the part.

25 Claims, 8 Drawing Sheets

METHOD AND APPARATUS FOR FORMING A PART WITH DAMPENER

FIELD OF THE INVENTION

The present invention relates to an apparatus and a method of forming a part with a dampener. More specifically, the invention relates to an apparatus and method of forming a brake component, such as a rotor, having a dampener.

BACKGROUND OF THE INVENTION

Automobiles, trucks, buses, off-road and construction vehicles, aircraft and light rail vehicles commonly use disk brakes. Disk brakes utilize a disk which turns with the wheel of the vehicle. When the brakes are applied, stationary pads are pressed against the rotor through hydraulic pressure by a brake caliper. The frictional forces between the brake pads and the rotor slow or bring the vehicle wheel to a stop.

A problem commonly associated with disk brakes is that unwanted noise and vibration are generated during the braking process. Numerous attempts have been made to reduce, or prevent, the unwanted noise and vibration by adding separate components to the rotor after it has been cast. For example, U.S. Pat. No. 5,855,257 provides for a ring damper affixed around the periphery of a rotor after the rotor is cast. The ring damper is designed to be located in the groove formed by the two joined disk plates. The ring is held in place by the groove and is alleged to absorb vibration, and reduce noise, from the rotor during braking.

U.S. Pat. No. 3,425,523 teaches a ventilated rotor with a vibration dampener. The dampener is constructed of wire and has a looped portion with two legs integrally formed with the loop. The dampener is removably disposed in one or a plurality of locations in the radially extending open ended apertures of a rotor after the rotor is cast.

U.S. Pat. No. 3,292,746 provides for a circular vibration dampening member having loop portions extending into spaces between circumferentially spaced, radially extending walls. The loop portions are a separate component added to the completed rotor after casting.

Rotors, such as those described above, are often manufactured using a sand core and a mold in a process well known to those skilled in the art. The dampener is added to the rotor in a manual step after it is taken from the mold and the sand core is removed.

Therefore, it would be desirable to have at least one dampening structure within a sand core where that sand core is used to form a part. After the part is cast about the sand core, the sand core is removed and the dampening structure is left behind in the part.

SUMMARY OF THE INVENTION

The present invention is directed to an apparatus and a method of forming a part, such as a brake rotor, with a dampener. A sand core is formed with at least one dampening structure within the sand core. The sand core and dampener are located in a mold. A part is cast from the mold and the sand core. The sand core is removed from the part while leaving the dampening structure in contact with the part.

The dampening structure may be such as a chain or spring. It may be of a one-piece or multi-piece construction and it may connect together with itself or remain separate. The dampener can be constructed from a heat and/or corrosion resistant material.

In accordance with the present invention, it has been discovered that a damped part, such as a brake rotor, with a dampening structure can be inexpensively, effectively and efficiently constructed. Thus, the manufacturing step of adding a separate external dampening structure, as known in the prior art, is avoided.

It has also been discovered that with the dampening structure trapped within the part, the risk of a damaged or broken structure being ejected from the part or interfering with other working parts is reduced or prevented.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
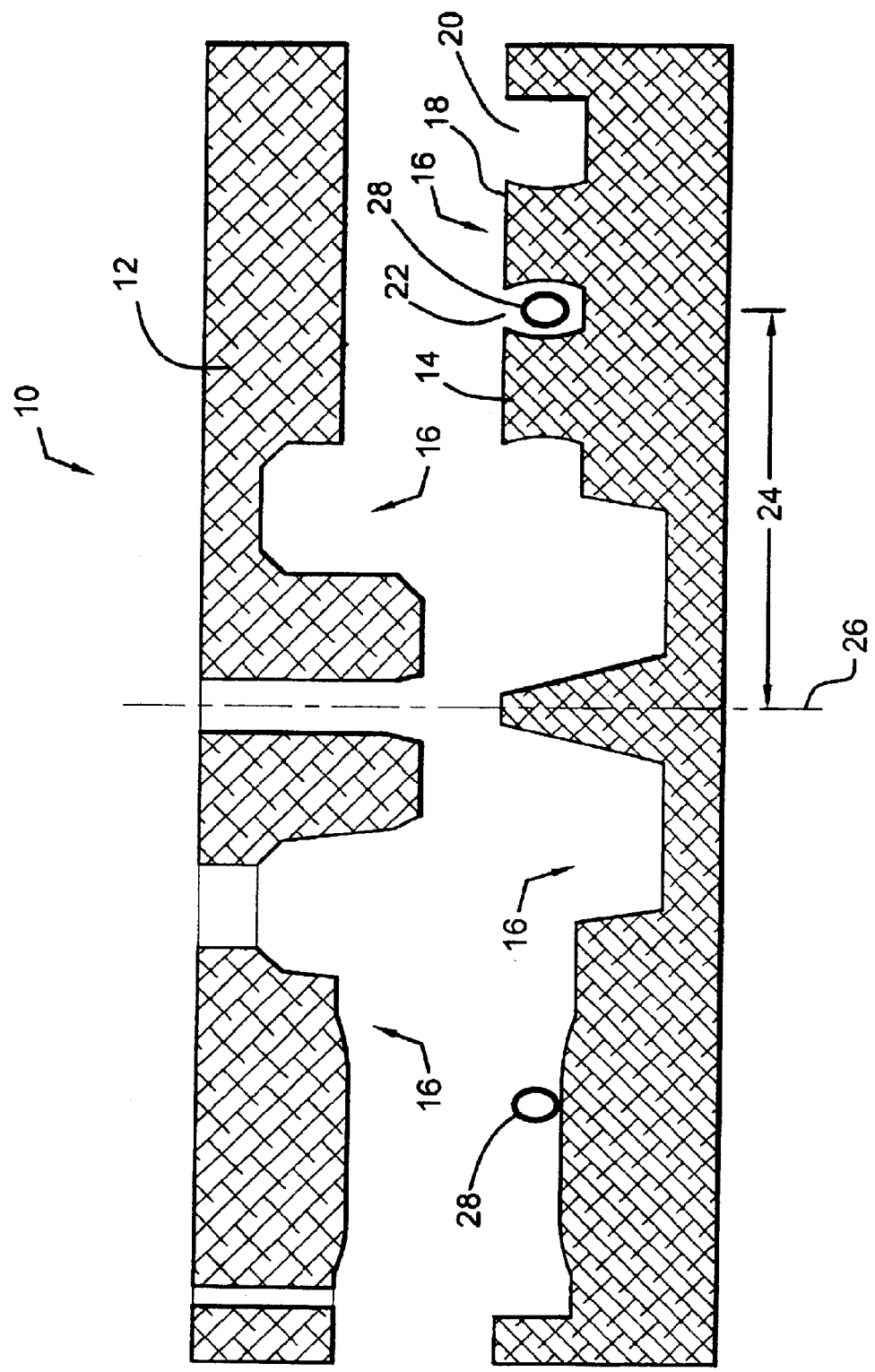
FIG. 1 is a schematic side view of an embodiment of the present invention.

Referring now to FIG. 1, a sand core mold 10 is depicted as having a first portion 12 and at least a second portion 14. The individual portions 12, 14 may be constructed of one piece or they may be of a multi-piece construction. In this embodiment, the first portion 12 is located above the second portion 14, however, the portions 12, 14 may be located in any orientation, including vertical, without departing from the scope of the present invention.

At least one of the portions 12 or 14 has a plurality of geometric structures 16. The geometric structures 16 may be such as a plurality of repeating peaks 18 and valleys 20 or they may be of any desired design, shape and/or orientation.

At least one channel 22 is located in one or both of the portions 12, 14. Preferably, the channel 22 is located among the plurality of geometric structures 16. Although it is preferred that the channel 22 is located at a substantially constant radial distance 24 from a centerline 26 of the portions 12, 14, deviations around the geometric structures 16 are well within the scope of the present invention.

At least one dampening structure 28 is located within the at least one channel 22. The dampening structure 28 may be located in the channel 22 by automated and/or manual means. As provided above, it is preferred that the channel 22 is located at a constant radial distance 24 from the centerline 26 to simplify the insertion of the dampening structure 28.

Figure 2:
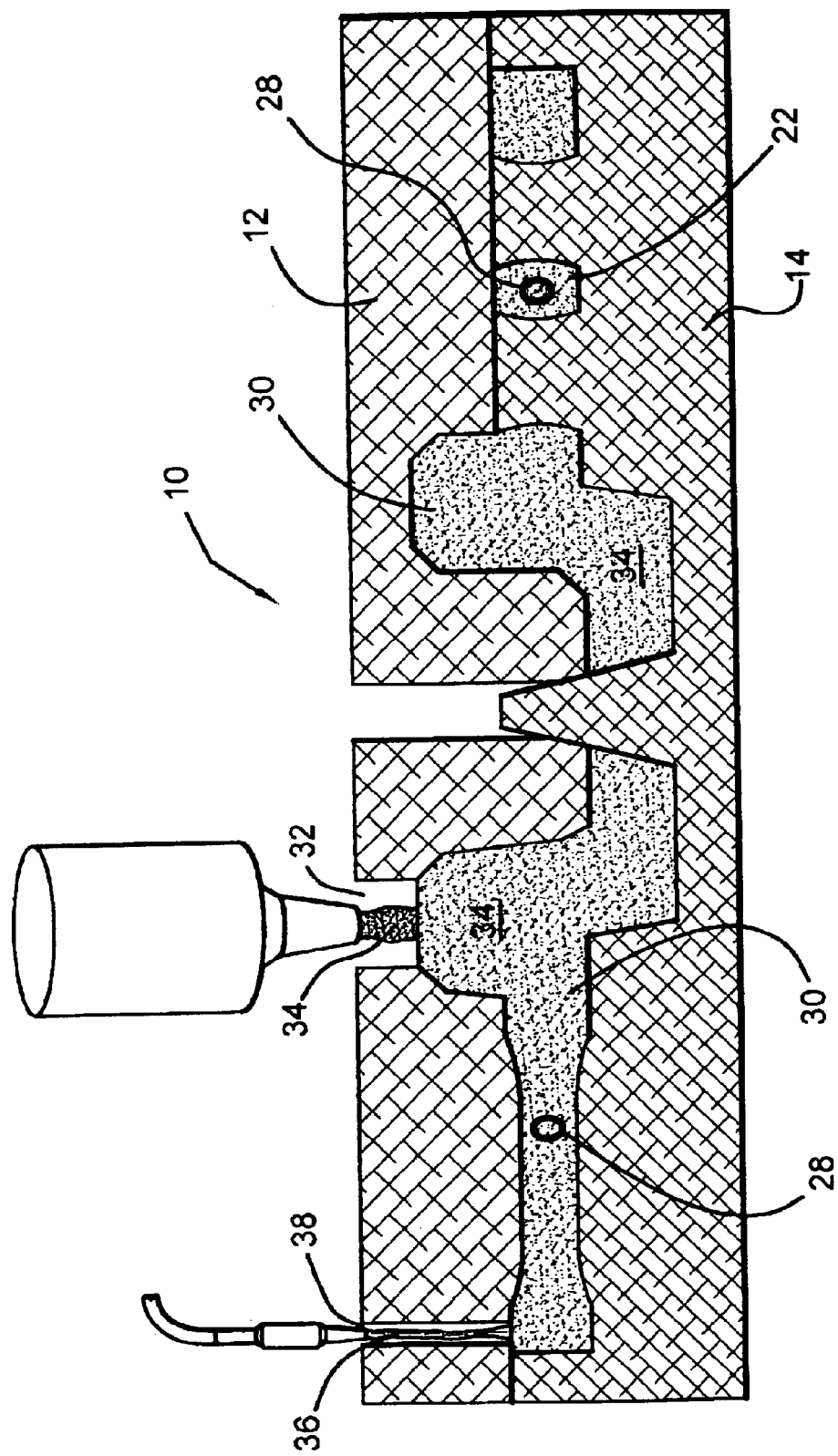
FIG. 2 is a schematic side view of an embodiment of the present invention.

An internal cavity 30 is defined by the combination of the two portions 12, 14, as depicted in FIG. 2. The cavity 30 may also be formed only in one of the portions 12 or 14.

The first 12 and second 14 portions may be combined by automated and/or manual means. The at least two portions 12, 14 are secured to prevent any relative motion between the portions 12, 14 in any known manner. Straps, latches, mechanical fasteners, weights, couplings, fluid driven machinery or the like may be used to secure the two portions 12, 14 together.

At least one of the portions 12 or 14 has at least one hole 32 in communication with the internal cavity 30. A predetermined quantity of granular material such as, for example, sand 34, is located through the at least one hole 32 and into the internal cavity 30. In a preferred embodiment, a plurality of holes 32 are in communication with internal cavity 30 and the sand 34 may be added through any number of the holes 32 in any sequence or in any amount. Those skilled in the art recognize that one method to insert the sand 34 into the holes 32 is to blow it in with compressed air. Other manual and/or automatic means to insert the sand 34 through the holes 32 and into the internal cavity 30 may be used without departing from the scope of the invention.

The sand 34 fills the internal cavity 30 including the geometric structures 16 and the channel 22. It is preferred that the sand 34 at least partially encapsulates the dampening structure 28.

At any point during, or after, the sand 34 has been inserted, a binder material 36 is added to the sand 34. The binder 36 may be such as an epoxy. It may be located into the internal cavity 30 through at least one aperture 38 in communication with the internal cavity 30. Preferably, a plurality of apertures 38 located in at least one of the portions 12, 14 is in communication with the internal cavity 30.

Manual or automatic means may be used to insert the binder 36 into the apertures 38 in any sequence, at any rate and at any time. The binder 36 mixes with the sand 34 in the internal cavity 30 causing the sand 34 to stick together and harden. Additionally, heat and/or pressure may also be added for a pre-determined amount of time to activate the binder 36 and cause the sand 34 to stick together and harden.

The sand 34 and binder 36 assumes a complementary shape to the internal cavity 30. Once the sand 34 is stuck together and hardened, the first 12 and second 14 portions may be removed resulting in a core of sand 40. The resulting core 40 includes the dampening structure 28. The dampening structure 28 may be entirely embedded in the core 40 or any portion of it may be exposed from the core 40.

Figure 3:
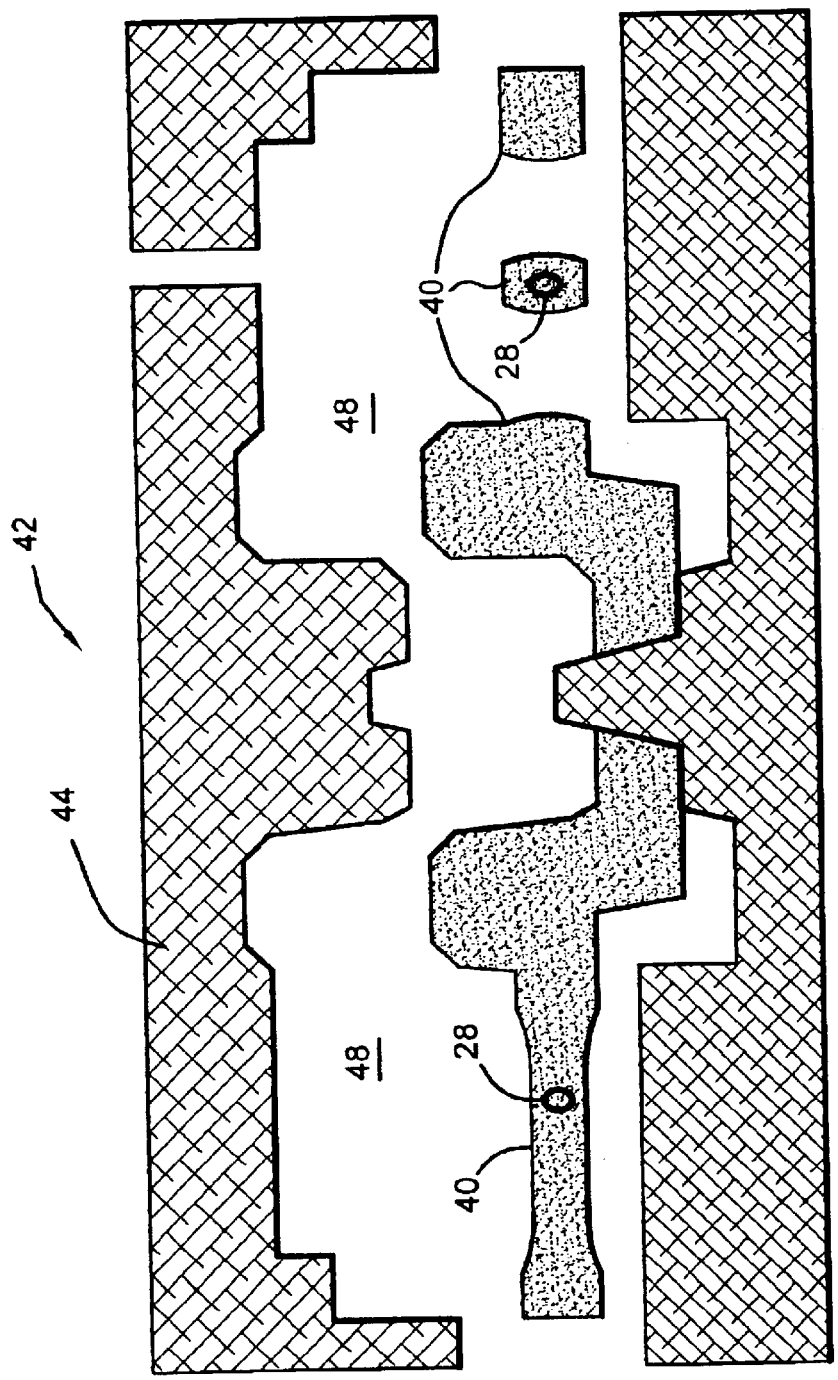
FIG. 3 is a schematic side view of an embodiment of the present invention.

The core 40 and dampening structure 28 are then located in a mold 42, such as that depicted in FIG. 3. The mold 42 may be for any product including, for example, a vehicle rotor. In one embodiment, the mold 42 has an upper 44 and a lower 46 portion. Although the terms "upper" and "lower" will be used for the remainder of this description, it should be understood that the mold 42 may be in any orientation, including vertical, without departing from the scope of the invention.

Figure 4:
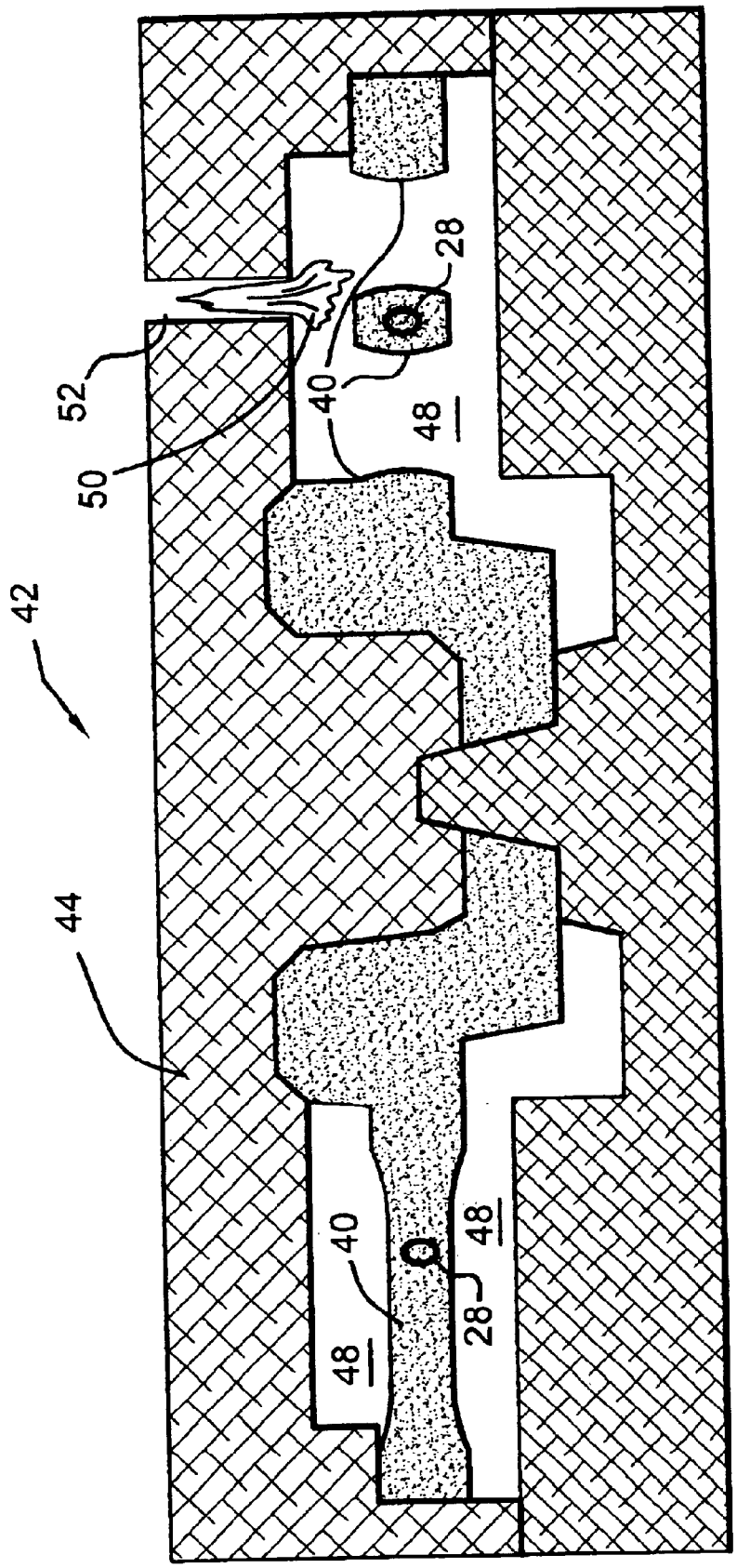
FIG. 4 is a schematic side view of an embodiment of the present invention.

The mold 42 is then closed. Straps, latches, mechanical fasteners, weights, couplings, fluid driven machinery or the like may be used to secure the two portions 44, 46 together. Preferably, the mold 42 has an internal cavity 48 defined by the upper 44 and/or lower 46 portions, as shown in FIG. 4. The mold 42 has a complementary shape to at least some portions of the core 40.

Molten metal material 50 such as, for example, iron, steel, aluminum or their alloys, is located in the internal cavity 48 of the mold 42. The molten material 50 may flow into the mold 42 through at least one riser 52 as depicted in FIG. 4. The molten material 50 flows throughout the internal cavity 48. A sufficient quantity of molten material 50 is added to the internal cavity 48 to fill it.

As the molten material 50 begins to solidify, it assumes a complementary shape to the internal cavity 48 of the mold 42 and the sand core 40 located therein. Using this process, any shape may be created. In one example, the molten material 50 solidifies adjacent the geometric structures 16 and the sand core 40 to form the inboard and outboard brake plates, the hat section and the plurality of brake plate supports of a vehicle brake rotor known to those skilled in the art. The brake plate supports may be such as the posts and fins commonly found within rotors as known to those skilled in the art, although other structures are well within the scope of the invention.

When the metal material 50 has adequately solidified, the upper 44 and lower 46 portions may be removed leaving a cast part. Using the example mentioned above, a vehicle brake rotor 54 is cast.

The sand core 40, however, is still located, at least partially, within the cast part. The sand core 40 may be removed from the cast part by any means known to those skilled in the art including, but not limited to, shaking, drilling, pressurized air and/or contacting the cast part with an object, such as a hammer.

Figure 5:
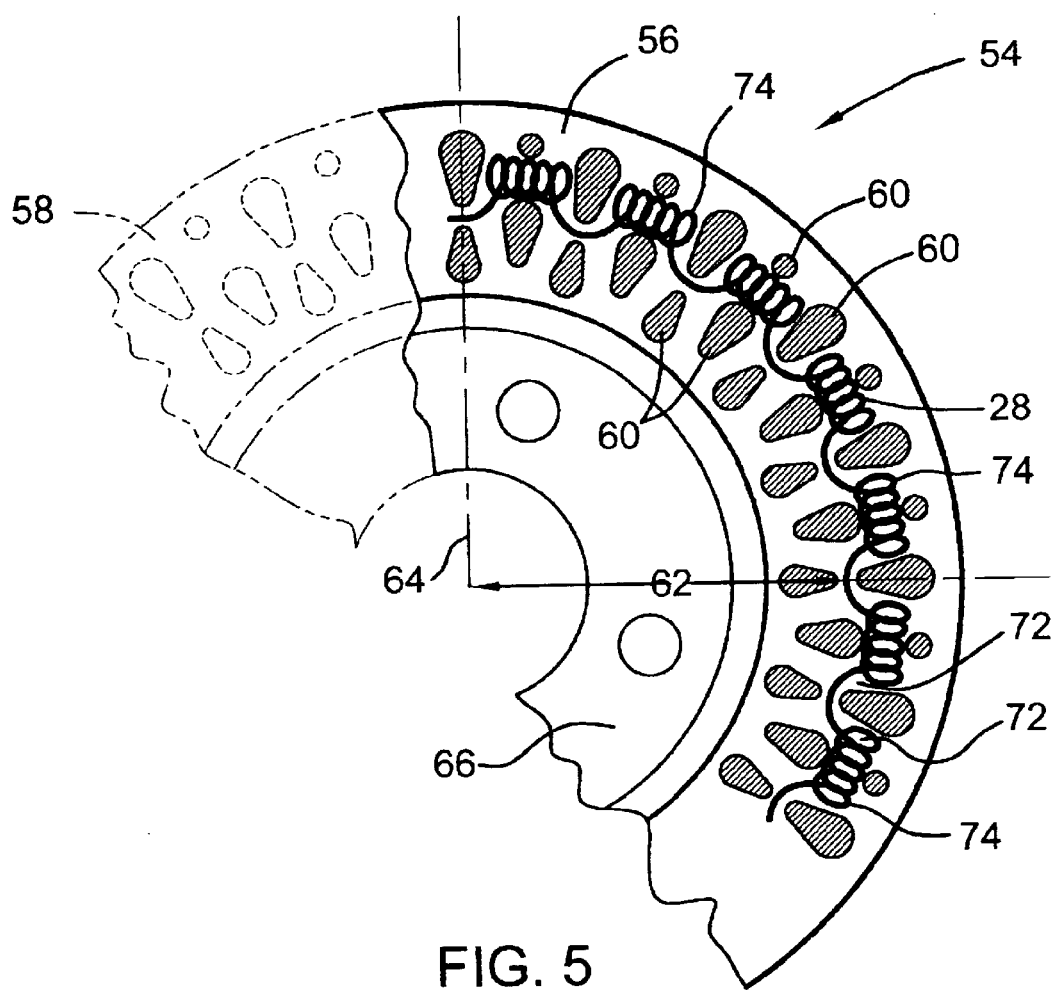
FIG. 5 is a schematic, sectional top view of an embodiment of the present invention.

After the sand core 40 has been removed from the part, the dampening structure 28 is left behind in the part. In the example of the brake rotor 54, the dampening structure 28 is left behind between the inboard 56 and the outboard 58 brake plates, and among the plurality of brake plate supports 60, as shown in FIG. 5. Preferably, the dampening structure 28 is located at a constant radial distance 62 from the center 64 of the hat section 66. The dampening structure 28, however, may be located in any orientation, including any symmetrical orientation. A symmetrical orientation assists in maintaining an even weight and balance across the entire rotor 54.

In a preferred embodiment, the at least one dampening structure 28 is a spring. Other dampening structures 28 such as, for example, chains and rings may be used separately or in combination with one another. If a chain is selected, any number of links and/or sizes of links may be used.

Where the dampening structure is a spring, the spring may be of any length. It may be of any shape, including round, flat and/or of a corrugated design. The spring may be constructed of wire of any thickness or construction known to those skilled in the art. The spring may be either left or right hand wound.

Figure 6:
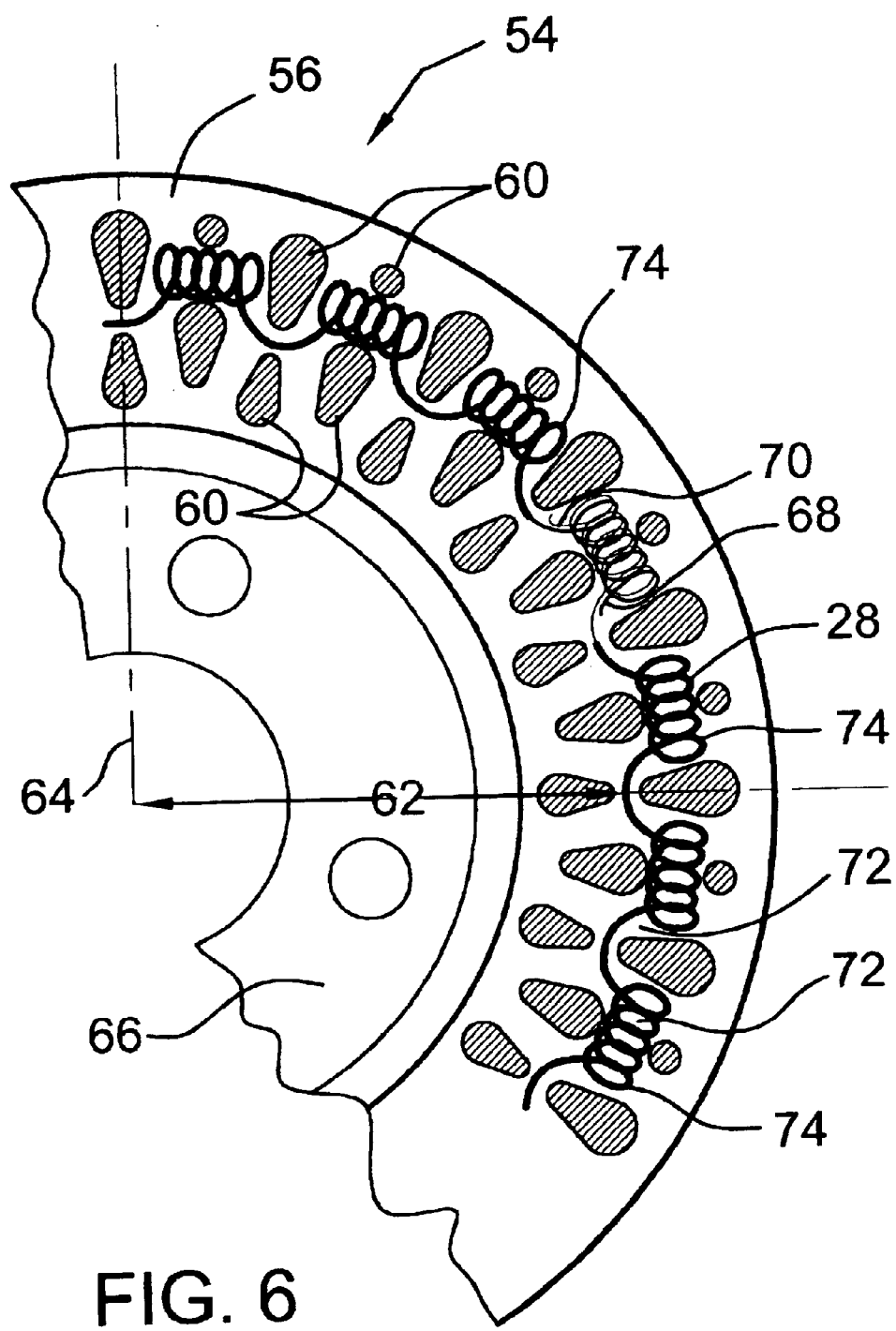
FIG. 6 is a schematic, sectional top view of another embodiment of the present invention.

Regardless of the dampening structure 28 selected, it may be of a one-piece or multi-piece construction. If the dampening structure 28 is of a one-piece construction, it will have a first end 68 and a second end 70. The ends 68, 70 can be connected to form a substantially continuous dampening structure 28. The ends 68, 70 can be intertwined together, as only schematically depicted in FIG. 6, or they may be mechanically joined, such as by hooks, by spot welds, by adhesive, or by any mechanical fastener known to those skilled in the art.

Figure 7:
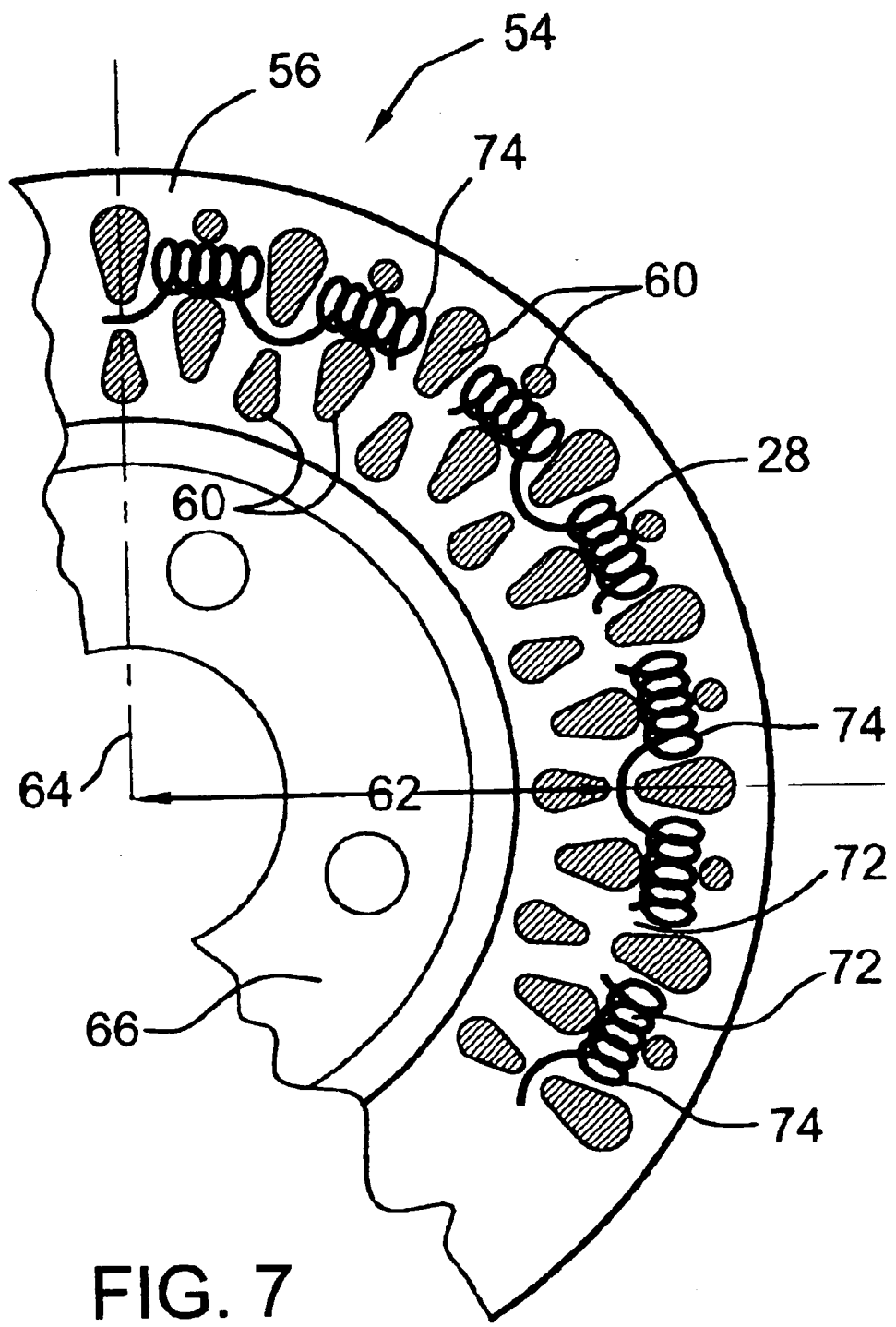
FIG. 7 is a schematic, sectional top view of another embodiment of the present invention.

If the dampening structure 28 is of a multi-piece construction, it is preferred that the individual pieces be connected together by some mechanical means. It should be noted that the dampening structure pieces 28, regardless of the number, do not have to be connected together to satisfy the spirit of the present invention. A multi-piece dampening structure is depicted in FIG. 7.

Preferably, the dampening 28 structure is constructed of a heat and corrosion resistant material. A heat resistant material prevents, or reduces, damage to the dampening structure during the casting process described in more detail below and/or during vehicle braking. A corrosion resistant material prevents, or reduces, damage to the dampening structure when it is exposed to environmental conditions.

The heat and corrosion resistant material may be, for example, high- or low-carbon steel, iron, chrome silicon, chrome vanadium, stainless steel, Inconel®, Monel®, beryllium copper, phosphor bronze or titanium. The material may be plated with materials known to those skilled in the art for additional strength and heat and corrosion resistance. Those skilled in the art will readily understand that other materials such as, by way of example only, elastomers, may be used without departing from the scope or spirit of the invention.

Figure 8:
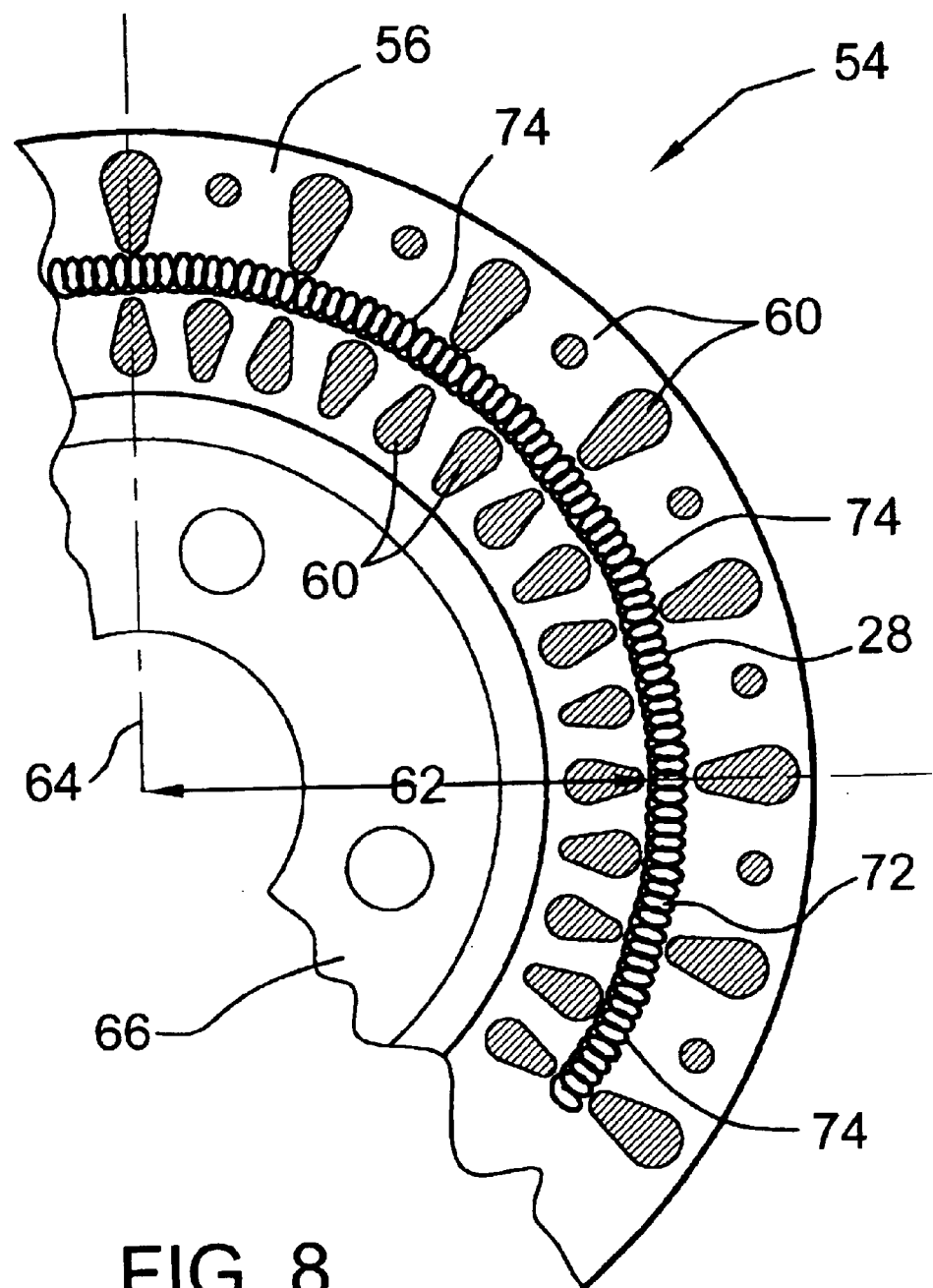
FIG. 8 is a schematic, sectional top view of yet another embodiment of the present invention.

Regardless of the dampening structure 28 selected, it is preferred that the structure 28 define a plurality of passages 72 for air to pass through. In the embodiment where the dampening structure 28 is a spring, the spring coils 74 define passages to allow air to freely circulate within the brake rotor 54. FIG. 8 depicts the passages 72 where the dampening structure 28 is located at a constant radial distance 62 from the center 64 of the hat section 66.

The brake rotor 54, with the dampening structure 28 located therein, is mounted on a vehicle axle. Noise or vibration generated during the braking process is transmitted from the brake plates 56, 58 to the dampening structure 28. The dampening structure 28 absorbs a portion of the noise and vibration to achieve a quiet brake rotor 54.

The dampening structure 28, in the preferred embodiment described above, is trapped among the brake plate supports 60 and the inboard 56 and the outboard 58 brake plates. If the dampening structure 28 is damaged, or breaks, the brake plate supports 60 and/or the brake plates 56, 58 will reduce, or prevent, the dampening structure 28 from interfering with structures adjacent the rotor 54. Such structures may include, by way of example only, brake rotor pads, brake calipers, drum brake shoes, drums, suspension components, steering mechanisms, and/or drivetrain components common to most vehicles and known to those skilled in the art.

Those skilled in the art will readily understand that the process described herein can be used for any cast part, including, but not limited to, brake drums and drum-in-hat rotors.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A method for making a damped part, comprising:

forming a sand core with at least one dampening structure within said sand core wherein said dampening structure has a plurality of air passages;

locating said sand core with said at least one dampening structure therein in a mold;

casting a part from said mold and said sand core, said part having a plurality of individual solid brake plate supports; and removing said sand core from said part while leaving said at least one dampening structure located between said solid brake plate supports and in contact with said part.

2. The method of claim 1, further comprising locating said at least one dampening structure in a sand core mold and locating sand in said mold.

3. The method of claim 2, wherein said at least one dampening structure is at least partially encapsulated by said sand in said sand core mold.

4. The method of claim 3, wherein a binder is added to said sand core mold to temporarily bind said sand and said at least one dampening structure in a complementary shape to said sand core mold.

5. The method of claim 4, wherein molten metal material is located adjacent said sand core in a part mold and said molten metal material is allowed to solidify.

6. The method of claim 5, wherein said metal material and said sand core are removed from the part mold and the sand core is separated from the metal material.

7. A method for making a damped disc brake rotor, comprising:

forming a sand core with at least one dampening structure within said sand core, wherein said dampening structure has a plurality of air passages;

locating said sand core with said at least one dampening structure in a rotor mold;

casting a rotor from said rotor mold and said sand core, said rotor having a plurality of individual solid brake plate supports;

removing said sand core from said rotor; and leaving said at least one dampening structure between said solid brake plate supports.

8. The method of claim 7, wherein said at least one dampening structure is located in a sand core mold.

9. The method of claim 8, wherein said sand core mold has a first portion and at least a second portion, said first and second portions define an internal cavity.

10. The method of claim 9, wherein said internal cavity has a plurality of geometric structures located therein.

11. The method of claim 10, wherein at least one of said first and said second portions has at least one channel and said at least one dampening structure is located within said channel.

12. The method of claim 9, wherein at least one of said first and said second portions has at least one hole in communication with said internal cavity.

13. The method of claim 12, wherein sand is located through said at least one hole to fill said internal cavity.

14. The method of claim 13, wherein at least one of said first and said second portions has at least one aperture in communication with said internal cavity.

15. The method of claim 14, wherein a binder is located through said at least one aperture to bind said sand together in said internal cavity.

16. The method of claim 15, wherein said binder and said sand form said sand core having a complementary shape to said geometric structures and said channel of said internal cavity.

17. The method of claim 10, wherein molten material is located in said rotor mold and about said sand core.

18. The method of claim 17, wherein said molten material solidifies in a complementary shape to said sand core.

19. The method of claim 18, wherein said molten material solidifies adjacent said geometric structures and said sand core to form a plurality of brake plate supports.

20. The method of claim 7, wherein said at least one dampening structure is constructed of a heat resistant material.

21. The method of claim 7, wherein said at least one dampening structure is constructed of a corrosion resistant material.

22. The method of claim 7, wherein said dampening structure is a one-piece construction.

23. The method of claim 7, wherein said dampening structure is a multi-piece construction.

24. The method of claim 7, wherein said dampening structure has a first end and a second end and said first end connects with said second end.

25. The method of claim 7, wherein said dampening structure is trapped among said brake plate supports thereby reducing or preventing interference of said dampening structure with structures adjacent said rotor.

* * * * *